MAGNETIC CORE

Original Filed April 19, 1947 5 Sheets-Sheet 1

INVENTORS
Robert C. Sefton
and John J. Zimsky
by their attorneys
Hooper, Leonard & Stearns

MAGNETIC CORE

Original Filed April 19, 1947 5 Sheets-Sheet 2

INVENTORS
Robert C. Sefton
and John J. Zimsky
by their attorneys
Hooper, Leonard & Glenn, INVENTORS
Robert C. Sefton
and John J. Zimsky
by their attorneys
Hooper, Leonard & Glenn

MAGNETIC CORE

Original Filed April 19, 1947 5 Sheets-Sheet 4

INVENTORS
Robert C. Sefton
and John J. Zimsky
by their attorneys
Hopes, Leonard & Glenn

MAGNETIC CORE

Original Filed April 19, 1947 5 Sheets-Sheet 5

INVENTORS
Robert C. Sefton
and John J. Zimsky
by their attorneys
Hoopes, Leonard & Glenn Patented Oct. 14, 1952

2,614,158

UNITED STATES PATENT OFFICE 2,614,158

MAGNETIC CORE

Robert C. Sefton, Dormont Borough, and John J. Zimsky, Canonsburg, Pa., assignors, by mesne assignments, to McGraw Electric Company, a corporation of Delaware Continuation of application Serial No. 742,614, April 19, 1947. This application January 7, 1950, Serial No. 137,424

2 Claims. (Cl. 175—356)

This invention relates to cores for transformers or the like made by winding a continuous length of magnetic strip in a coil and linking the coil with preformed electrical windings.

This is a continuation of our copending application Serial No. 742,614, filed April 19, 1947, for Electrical Transformer and Core Therefor, which is now abandoned.

The use of cold-rolled strip of appropriate composition in the manufacture of transformer cores is desirable because of its relatively low cost, high uniformity and good magnetic properties. This material usually exhibits better magnetic properties in the direction of rolling than at right angles thereto. It is desirable, therefore, to bend the strip lengthwise to conform to the shape of the magnetic circuit. Such cold work impairs the magnetic properties and necessitates that the cores be annealed after they have been formed. It has not been possible, however, with the core structures and methods of assembly known heretofore, to obtain the full advantage of the good magnetic properties of cold-rolled strip.

In the case of one known form of core, for example, considerable deformation of the laminations is necessary after final annealing, in order to link the core with the windings, causing increased core loss and exciting current. Another form, i. e., a close spiral wound from a single length of strip, exhibits a concentration of flux at points of cross-over from one turn to the next which is undesirable. Still another type of core made from strip by winding it in a coil and cutting it open, requires extreme care in assembly and the application of precisely the correct amount of pressure, in order to avoid excessive exciting current and noise in operation.

We have invented a novel transformer core which overcomes the aforementioned objections, exhibits low losses, requires small exciting currents, and may be made at relatively low cost. In a preferred embodiment and practice, we wind a length of strip in a coil and cut through the turns to render them discontinuous. We then assemble the turns, preferably in a plurality of concentric sections, with the ends of each turn in overlapping relation to form a closed core. The core is then shaped and annealed. After annealing, the turns of the core are opened up and placed on a preformed winding and the ends of the turns are restored to overlapping relation. The bending of the core turns necessary to permit the application thereof to the winding does not exceed the elastic limit of the material so that the magnetic properties are not impaired.

A complete understanding of the invention may be obtained from the following detailed description of the method and the resulting product and the illustration thereof in the accompanying drawings. In the drawings, Figure 1 is an elevation of a core in the process of being wound on a mold;

Figures 1, 2, 3, 4:
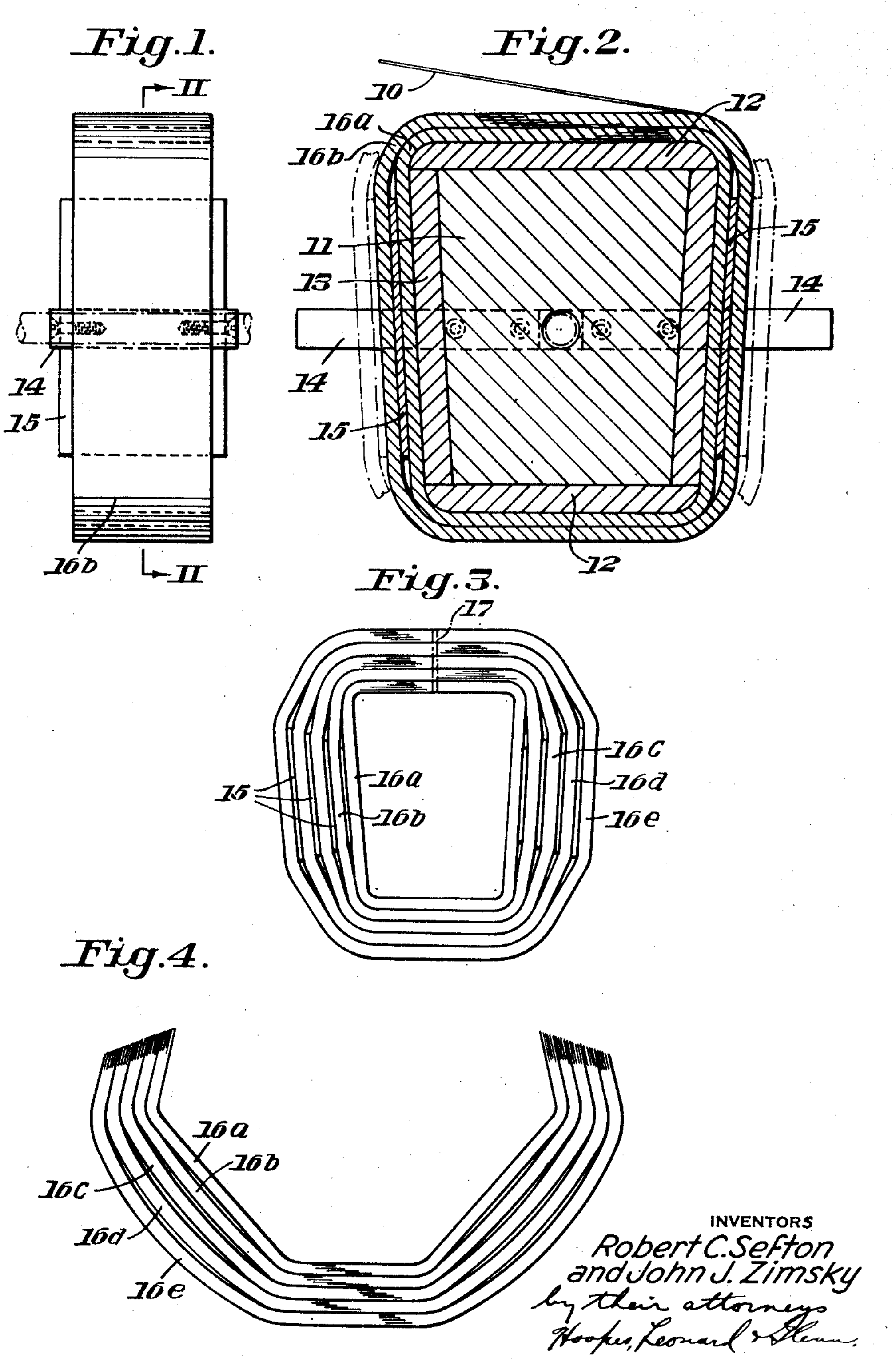
Figure 2 is a section therethrough taken along the plane of line II—II of Figure 1.
Figure 3 is an elevation of a completed core winding.
Figure 4 shows the core winding after the turns thereof have been cut through once.

Referring now in detail to the drawings, we form a transformer core by winding ferrous strip 10 of suitable composition and dimensions, in a single length on a mold block 11 having removable surface plates 12 and 13. The block 11 is adapted to be mounted on the face plate of a winding lathe so that the strip 10 may readily be wound thereon after the end has been suitably anchored. The block has the same width as the strip. The block has guide bars 14 secured to opposite sides thereon to confine the turns of the strip. As the winding of a core proceeds, spacers 15 of suitable material are inserted between adjacent turns, every so often, dividing the turns into sections 16a, 16b, etc. While these sections have been cross-hatched in the same direction throughout, it will be understood that each section includes a plurality of thicknesses or plies of the strip 10. As shown in Figure 1, the spacers 15 extend slightly beyond the sides of the block 11. The sides of the spacers are notched to accommodate the guide bars 14. The spacers may be of metal or press board. They serve to increase gradually the length of the mean turn of succeeding sections as the core is wound, for a purpose which will appear later.

It will be observed that the mold block 11 with its surface plates 12 and 13 defines a quadrilateral with rounded corners having two pairs of opposite sides. The one pair of sides has the same length while the sides of the other pair differ in length. It will be understood that the exact dimensions of the mold will be determined by the size of the desired finished core.

When the core winding has been built up to the desired thickness, the coil of strip is clamped by suitable means and removed from the mold block. The strip is deformed as it is bent around the corners of the mold but has a tendency to unwind, if not restrained. Figure 3 illustrates the condition of the core after winding and removal from the mold block. The turns of the core winding are then cut through on a plane intermediate the ends of the longer of the two opposite sides of unequal length, as indicated at 17. The cut may be made by any convenient means such as a saw or cutting disc.

After completion of the cut, the clamping means are removed from the core whereupon the turns or laminations spring open to the position shown in Figure 4 by reason of their natural resilience. The spacers 15 are then removed and the laminations are stacked to form a closed transformer core. To facilitate stacking of the laminations, we employ a press 18 including a flat base 19 having a fixed abutment 20 at one side and a movable abutment 21 adjacent the other side. The movable abutment is actuated by a screw 22 traversing a tapped bore in a block 23 on the base. The movable abutment is guided by pins 24 traveling in slots 25 in the base.

Figures 5, 6:
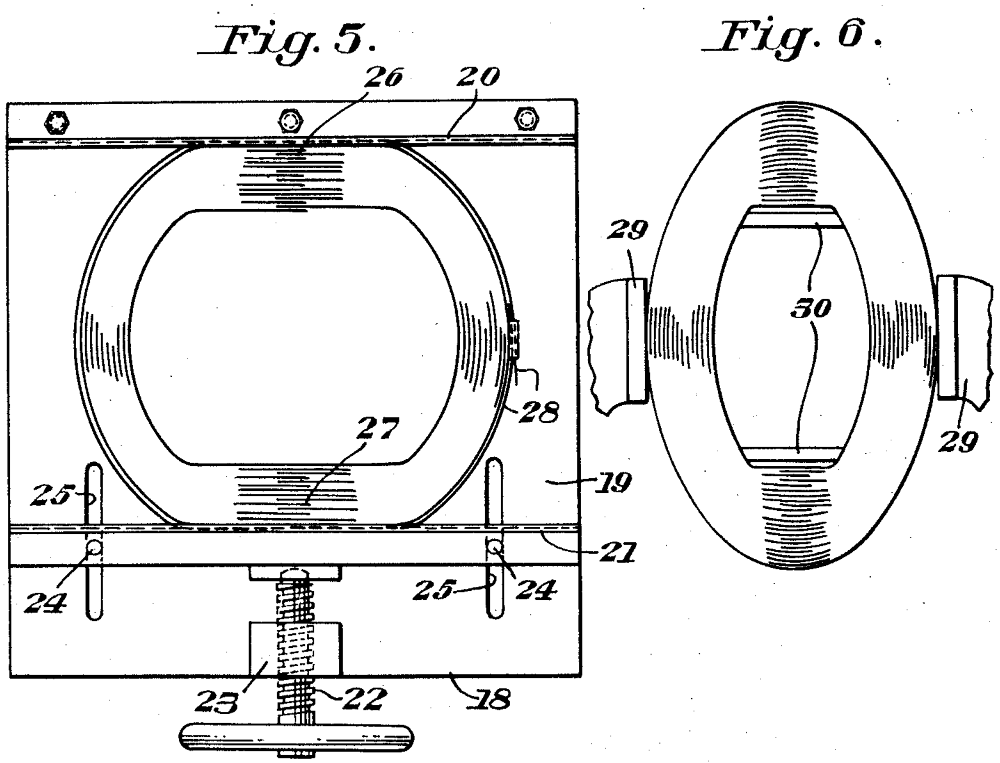
Figure 5 is a plan view of a press which we employ to hold the core turns while being stacked to form a core.
Figure 6 is a diagrammatic view illustrating the shaping of the stacked turns prior to final annealing.

At the beginning of the stacking operation, the movable abutment is advanced toward the fixed abutment so that the stacking can be performed starting from the outside and working inwardly. In stacking the laminations to form a core, we take the outermost section 16e, dispose the mid-portion thereof against the movable abutment 21 and then dispose the ends of successive laminations in overlapping relation, as indicated at 26. While it is not possible, on the scale to which Figure 5 is made, to illustrate individual laminations, an attempt has been made to indicate the manner in which the ends of successive turns overlap. It will be evident that the right-hand end of the first lamination is lapped over the left-hand end. The left-hand end of the second lamination is then lapped over the right-hand end of the first lamination after which the right-hand end of the second lamination is lapped over the left-hand end thereof.

When the laminations of the outermost section 16e have been disposed in the press with their ends in overlapping relation as described, the next section 16d inwardly is stacked in the same manner except that the mid-portions of the laminations are disposed against the lapped ends 26 of the laminations of section 16e. The open ends of section 16d are thus disposed adjacent the movable abutment 21 and they are lapped and interleaved at 27 in the same manner as the ends of the first section 16e. The abutment 21 is backed off as necessary to permit the continuous stacking of the laminations. It will be evident that the extra length provided in the side or leg of the core through which the cut 17 is made provides for the lapping of the ends of the turns or laminations when both pairs of opposite sides or legs are made of substantially the same length.

The stacking operation is continued as above described, successive sections of laminations being reversed relative to the preceding section. As a result, the lapped ends of each section are substantially in alinement with each other but the lapped ends of adjacent sections are disposed on opposite sides of the core. When the stacking has been completed, a securing band 28 is disposed about the core, the abutments 20 and 21 being slotted to permit this. During the stacking, the press is adjusted progressively to exert sufficient pressure on the laminations to hold the lapped ends thereof parallel. When the banding strip 28 has been applied, the core is removed from the press. It thereupon assumes the shape shown in Figure 6 because of the natural resilience of the laminations.

Figure 7:
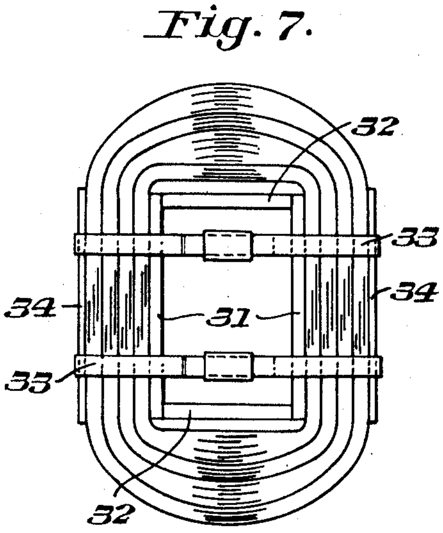
Figure 7 shows a completed core after shaping and binding in preparation for annealing.

In order to bring the core laminations to the desired final shape, we compress the sides adjacent those in which the ends of the laminations are lapped, between vise jaws 29 or other compression heads and drive a wedge between spreader plates 30 inserted through the central opening or window of the core. In this way, the core is brought to the shape shown in Figure 7. It is held in that shape by a blocking out form including side spreader plates 31 and end spreader plates 32, and binding straps 33 extending circumferentially thereof and spaced apart longitudinally. Bearing plates 34 are disposed along the outer sides of the core to protect the edges of the outer laminations. When the core has thus been finally shaped, it is ready for annealing to remove the effects of the deformation to which the turns of the core are subjected in the operations already described. The core is annealed in the known manner by heating it in a suitable atmosphere to a temperature of about 1650° F. After annealing, the blocking form and binding straps are removed, leaving the core in the condition shown in Figure 8. The laminations, of course, take a permanent set as a result of the annealing and thereafter remain in place without the necessity for binding or compression.

Figure 8:
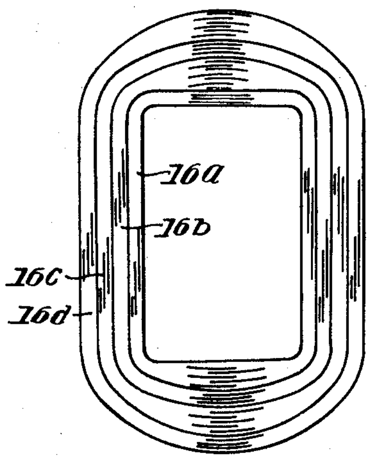
Figure 8 shows the core in the annealed condition.
Figures 9, 10, 11, 12, 13:
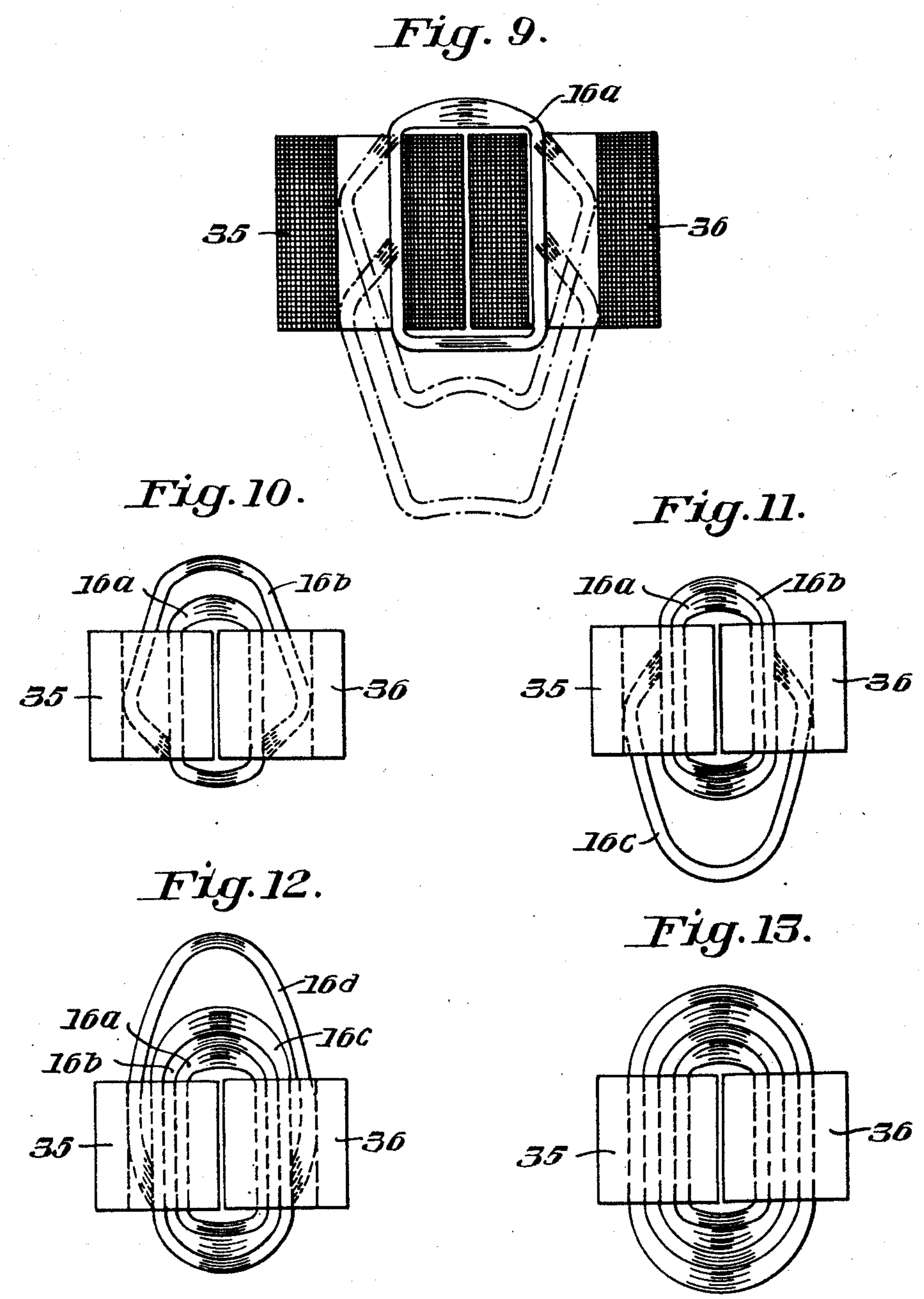
Figure 9 is a diagram illustrating the insertion of a plurality of core turns or laminations through a pair of transformer windings to form a core-type transformer.
Figures 10 through 12 show succeeding steps in the assembly of the core laminations with the windings.
Figure 13 shows the completed transformer.

The assembly of the core as shown in Figure 8 with preformed transformer windings is illustrated in Figures 9 through 13. In order to assemble a core-type transformer, preformed windings 35 and 36 are disposed side-by-side. One of these windings may be the primary and the other the secondary, or the primary and secondary windings may be divided into two groups. The innermost section 16a of the core is first separated from the remaining sections and its lapped ends opened up slightly. The ends are then inserted, as shown in Figure 9, through the central openings in the windings 35 and 36. It will be observed that slight bending of the shorter legs of the core section is necessary to permit this insertion but the deformation does not exceed the elastic limit so the magnetic properties of the core material are not impaired. When the open ends of the core section have been passed entirely through the opening of the windings, they are brought together and the ends of successive laminations are restored to their previous interlapping relation. Successive positions of the core section as it is inserted through the windings are illustrated in chain lines in Figure 9, the final position being shown in solid lines.

When the first core section has been placed as above described, the next section 16b is inserted, as shown in Figure 10, the final position of this section being illustrated in Figure 11. It will be observed that the laps of the laminations of the two sections are disposed at opposite ends of the windings. This results from the fact that the second section 16b is inserted in a direction opposite that in which the first section 16a is inserted.

The insertion of sections 16c and 16d, as shown in Figures 11 and 12, respectively, results in a complete transformer as illustrated in Figure 13. It will be understood, of course, that the windings and core may be bound or clamped in any desired manner to secure them in place against the electromagnetic stresses developed in operation, and disposed in any suitable case or container, all in accordance with the known practice. In any event, it is clear that the end result illustrated in Figure 13 comprises transformer windings linked by a core wound from magnetic strip, the turns of the core windings being discontinuous and having their ends in overlapping relation.

Figure 14:
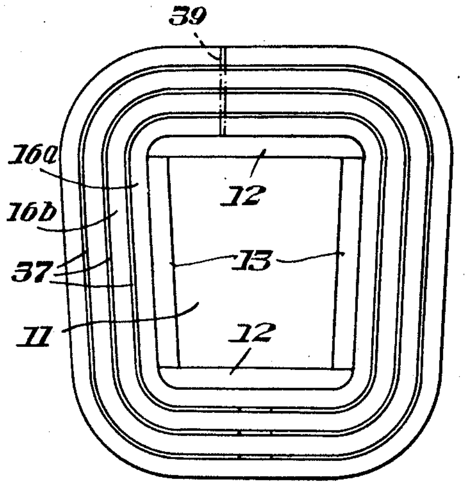
Figures 14 and 15 are views similar to Figure 3 showing modified forms of core windings.
Figure 15:
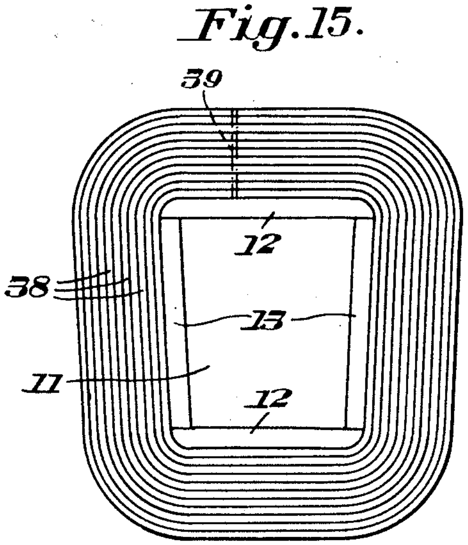

Figure 14 illustrates a modified spacer 37 disposed between sections 16a, 16b, etc. This spacer is a strip extending around almost the full perimeter of each section except for a gap on the shorter of the two unequal sides of the mold block 11. This type of spacer provides for an increase in the length of all legs of the core from one section to the next, instead of only the two sides of equal length, as in the case of the spacers 15. Figure 15 illustrates a further modified spacer 38 which is a continuous strip wound on the mold with the magnetic strip forming the core turns. The spacer strip 38 provides a progressive increase in the length of turns from one turn to the next. It will be apparent that the spacers 37 and 38 are severed when the core turns are cut through along the plane 39. The spacers are discarded when the laminations are stacked as shown in Figure 5.

Figure 16:
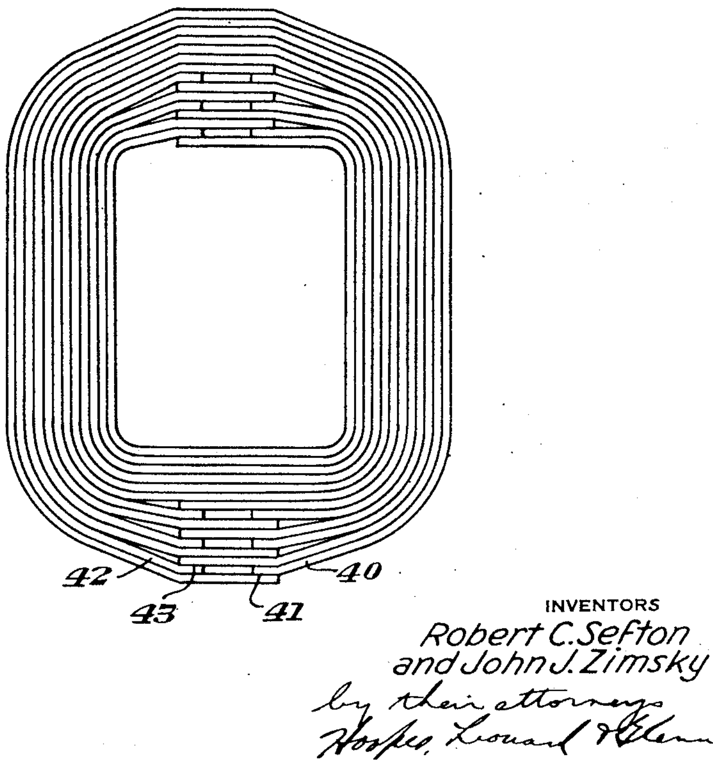
Figure 16 shows an alternate method of stacking the core laminations.

It will be noted that the plane 39 on which the cut through the laminations is made as shown in Figures 14 and 15 is spaced from the central transverse plane on which the cut 17 is made, as shown in Figure 3. This has the advantage that it permits the laps of successive laminations in the same core section to be staggered, as shown in Figure 16.

This result is attained by turning over alternate laminations as they are stacked. In other words, the outermost lamination of Figure 16, designated 40, has its ends lapped at 41. The next lamination inwardly, designated 42, is turned over so that its lapped ends are disposed at 43. This reduces the "build-up" of the coil thickness at the point where the ends of the laminations are lapped, as compared to the stacking method previously described. In Figure 16, the thickness of the laminations has been exaggerated for clearness. It will be noted that the lapped portions of successive core sections are staggered at opposite ends of the core, in the same manner as in the construction described previously.

Figure 17:
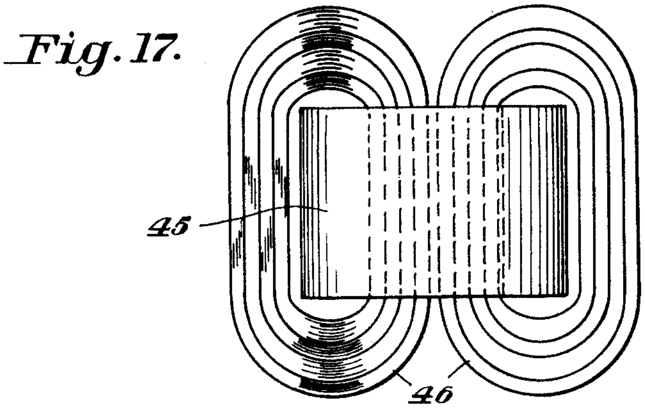
Figure 17 shows the application of the invention to a shell-type transformer.

Figure 17 illustrates a transformer of the shell-type including electrical windings 45 and a pair of wound cores 46 similar to that shown in Figure 13.

Figure 18:
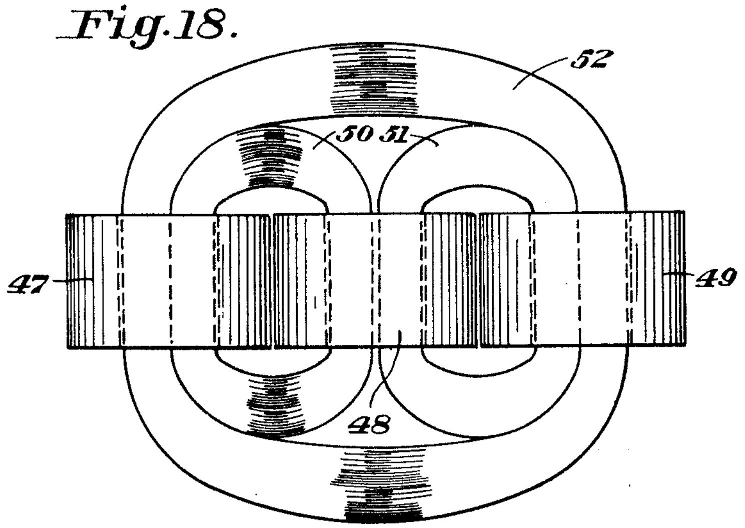
Figure 18 is an elevation of a three-phase transformer utilizing cores made according to our invention.

Figure 18 shows a three-phase transformer having winding groups 47, 48 and 49 disposed side-by-side. Wound cores 50 and 51 link the windings 48 with each of the windings 47 and 49. A third wound core 52 also links the windings 47 and 49 and embraces the cores 50 and 51.

Figure 19:
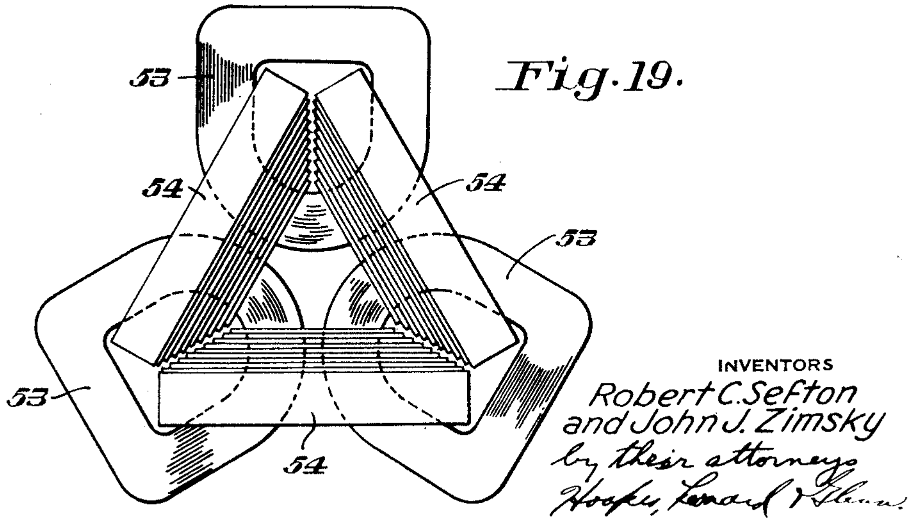
Figure 19 shows a further type of three-phase transformer.

Figure 19 shows a modified form of three-phase transformer including a plurality of winding groups 53 disposed parallel to each other and symmetrically spaced about a common axis. Each pair of adjacent winding groups is linked by a wound core 54. The cores 54 are similar to the core shown in Figure 13 except that the laminations or sections are telescoped inwardly toward the center to conform to the shape of the openings through the winding groups. These openings, of course, are designed with a view to the most efficient use of both winding and core material.

It will be apparent from the foregoing that our core and method of manufacture have numerous advantages over wound cores known previously and the methods for making them. In the first place, our core exhibits a lower loss and requires a smaller exciting current than cores previously known. In the second place, our method of manufacture is simple and can be carried out rapidly at high efficiency so that the finished transformer compares favorably in cost with former types. It is not necessary, for example, to use extreme care in assembling the laminations as in the case of some types of wound cores previously proposed. The deformation to which the core laminations are subjected after annealing does not exceed the elastic limit and thus does not impair the magnetic properties. The lapping of the ends of successive core turns permits the magnetic flux to pass across the air gap at a low density without undue concentration. Since each lamination forms a complete magnetic circuit, there is no necessity for the flux to pass from one lamination to the other.

Although we have illustrated and described but a preferred practice and embodiment with certain modifications, it will be recognized that changes in the details of procedure and construction disclosed herein may be made without departing from the spirit of the invention or the scope of the appended claims.

We claim:

1. In a preformed closed core of magnetic strip material for a transformer or the like, in combination, a plurality of concentrically stacked lengthwise laminations, substantially all of said laminations having a permanent set to form a generally rectangular, hollow four-sided core of individual whole turns, a plurality of successive turns forming a section, a plurality of successive sections forming said core, at least one side of said core being a winding leg, a single lap joint in each of said turns along one of the sides thereof adjoining the side of said turn in said winding leg of said core, the ends of each said turn overlapping a relatively short distance and terminating along the intermediate portion of the side in which the lap joint occurs, said lap joint side having a length when the ends thereof are in lapped position generally equal in length to the sides of said turn opposite thereto, successive turns having their lap joint sides generally parallel and their lap joints respectively in alinement, and a plurality of said successive sections having their lap joint sides positioned on opposite ends of said core.

2. In a preformed closed core of magnetic strip material for a transfomer or the like, in combination, a plurality of concentrically stacked lengthwise bent laminations, substantially all of said laminations having a permanent set to form a generally rectangular, hollow four-sided core of individual whole turns, at least one side of said core being a winding leg, a single lap joint in each of said turns along one of the sides thereof adjoining the side of said turn in said winding leg of said core, the ends of each said turn overlapping a relatively short distance and terminating along the intermediate portion of the side in which the lap joint occurs, said lap joint side having a length when the ends thereof are in lapped position generally equal in length to the side of said turn opposite thereto, and successive ones of said turns having their lap joint sides generally parallel and their lap joints respectively in alinement.

ROBERT C. SEFTON.
JOHN J. ZIMSKY.

REFERENCES CITED

The following references are of record in the file of this patent:

UNITED STATES PATENTS

| Number | Name | Date |
|---|---|---|
| 389,838 | De Ferranti | Sept. 18, 1888 |
| 435,114 | De Ferranti | Aug. 26, 1890 |
| 1,933,140 | Gakle | Oct. 31, 1933 |
| 1,935,426 | Acly | Nov. 14, 1933 |
| 2,058,362 | Smalley | Oct. 20, 1936 |
| 2,305,649 | Vienneau | Dec. 22, 1942 |
| 2,305,650 | Vienneau | Dec. 22, 1942 |
| 2,344,294 | Evans | Mar. 14, 1944 |
| 2,400,994 | Horstman et al. | May 28, 1946 |
| 2,401,952 | Mayberry | June 11, 1946 |
| 2,431,128 | Link | Nov. 18, 1947 |
| 2,431,155 | Woolfolk | Nov. 18, 1947 |
| 2,456,457 | Somerville | Dec. 14, 1948 |
| 2,478,029 | Vienneau | Aug. 2, 1949 |

FOREIGN PATENTS

| Number | Country | Date |
|---|---|---|
| 74,678 | Switzerland | Apr. 2, 1917 |
| 499,010 | Great Britain | Jan. 17, 1939 |
| 521,125 | Great Britain | May 13, 1940 |